US008453932B2

(12) United States Patent
Matsuda

(10) Patent No.: US 8,453,932 B2
(45) Date of Patent: Jun. 4, 2013

(54) COMMODITY INFORMATION READING APPARATUS AND COMMODITY INFORMATION READING METHOD

(75) Inventor: Yoshihiro Matsuda, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/251,331

(22) Filed: Oct. 3, 2011

(65) Prior Publication Data

US 2012/0104098 A1 May 3, 2012

(30) Foreign Application Priority Data

Oct. 28, 2010 (JP) ................................ 2010-242740

(51) Int. Cl.
*G06K 7/10* (2006.01)

(52) U.S. Cl.
USPC ..................................... 235/462.01; 235/383

(58) Field of Classification Search
USPC ........................ 235/462.01, 462.09, 383, 454
See application file for complete search history.

(56) References Cited

U.S. PATENT DOCUMENTS 7,195,689 B2 * 3/2007 Adams et al. ................. 156/252
7,214,891 B1 * 5/2007 Hewitt et al. ..................... 177/4
2004/0050941 A1 * 3/2004 Hanyu et al. .................. 235/487
2012/0048926 A1 * 3/2012 Naito et al. ................... 235/383
2012/0055994 A1 * 3/2012 Yanagi .......................... 235/454

FOREIGN PATENT DOCUMENTS

JP 63-300391 12/1988
JP 2007-176558 7/2007
JP 2007-334715 12/2007
JP 2008-033640 2/2008
JP 2008-164820 7/2008

OTHER PUBLICATIONS

Japanese Office Action for Japanese Application No. 2010-242740 dated Aug. 28, 2012.
Japanese Office Action for Japanese Application No. 2010-242740 dated Nov. 27, 2012.

* cited by examiner

*Primary Examiner* — Ahshik Kim
(74) *Attorney, Agent, or Firm* — Turocy & Watson, LLP

(57) ABSTRACT

A commodity information reading apparatus includes: an image capturing section capturing a picked-up image; a first reading section detecting the code symbol from the captured image and reading the commodity information represented by the code symbol; a second reading section detecting, if the reading by the first reading section is not realized, a benefit label from the captured image and reading benefit information corresponding to the benefit label; and a third reading section detecting, if the reading by the second reading section is realized, the character string from the captured image and reading the commodity information represented by the character string. The benefit label is affixed to a position on the code symbol where reading of the code symbol is impossible.

10 Claims, 5 Drawing Sheets

FIG.4

216b

| No | LABEL CHARACTERISTIC DATA | BENEFIT INFORMATION |
|---|---|---|
| No.1 | HALF PRICE OFF LIST PRICE | -50% |
| No.2 | $0.20 OFF LIST PRICE | -$0.20 |
| ⋮ | ⋮ | ⋮ |

COMMODITY INFORMATION READING APPARATUS AND COMMODITY INFORMATION READING METHOD

CROSS-REFERENCE TO RELATED APPLICATIONS

This application is based upon and claims the benefit of priority from the prior Japanese Patent Application No. 2010-242740, filed on Oct. 28, 2010; the entire contents of which are incorporated herein by reference.

FIELD

Embodiments described herein relate generally to a commodity information reading apparatus and a commodity information reading method.

BACKGROUND

In the past, in a retail store such as a supermarket, commodities are often sold at discounted prices. In this case, the store affixes a label (a benefit label), on which a discount amount or a discount ratio is shown, to a commodity to clearly indicate to customers that the commodity is a discounted commodity. If a benefit label is affixed to a commodity purchased by a customer, an operator of a POS (Point Of Sales) terminal reads a barcode affixed to the commodity using a scanner device and operates a keyword, a touch panel, or the like to perform processing concerning a discount.

Concerning the reading of the barcode, there is known a technique for picking up images of the barcode and the benefit label using an image sensor such as a CCD and reading information concerning a commodity code and a discount from the picked-up images of the barcode and the benefit label.

In the related art, a store clerk of the store moves the barcode affixed to the commodity to an image pickup area of the image sensor, whereby the reading of the commodity code is performed. However, if the barcode and the benefit label are apart from each other, it is likely that the benefit label is absent in the image pickup area of the image sensor. Since the store clerk needs to move the benefit label into the image pickup area of the image sensor, operation is complicated. In this case, if the store clerk overlooks the benefit label, sales registration is performed while a discount is not performed. Therefore, there is a demand for a technique that makes it possible to more surely perform the reading of the benefit label.

DESCRIPTION OF THE DRAWINGS

FIG. 4 is a diagram for explaining a label characteristic file; and

DETAILED DESCRIPTION

In general, according to one embodiment, a commodity information reading apparatus that performs reading of commodity information from a commodity affixed with a code symbol and a character string representing commodity information includes an image capturing section, a first reading section, a second reading section, and a third reading section. The image capturing section captures an image picked up by an image pickup section. The first reading section detects the code symbol from the image of the commodity captured by the image capturing section and reads the commodity information represented by the code symbol. The second reading section detects, if the reading by the first reading section is not realized, a benefit label representing content of a benefit applied to the commodity from the image captured by the image capturing section and reads benefit information corresponding to the benefit label. The third reading section detects, if the reading by the second reading section is realized, the character string from the image captured by the image capturing section and reads the commodity information represented by the character string. The benefit label is affixed to a position on the code symbol where reading of the code symbol is impossible.

A commodity information reading apparatus and a commodity information reading method according to an embodiment are explained below using a checkout system as an example. In this embodiment, an example in which the commodity information reading apparatus and the commodity information reading method are applied to a checkout system installed in a store such as a restaurant or a supermarket is explained.

Figure 1:
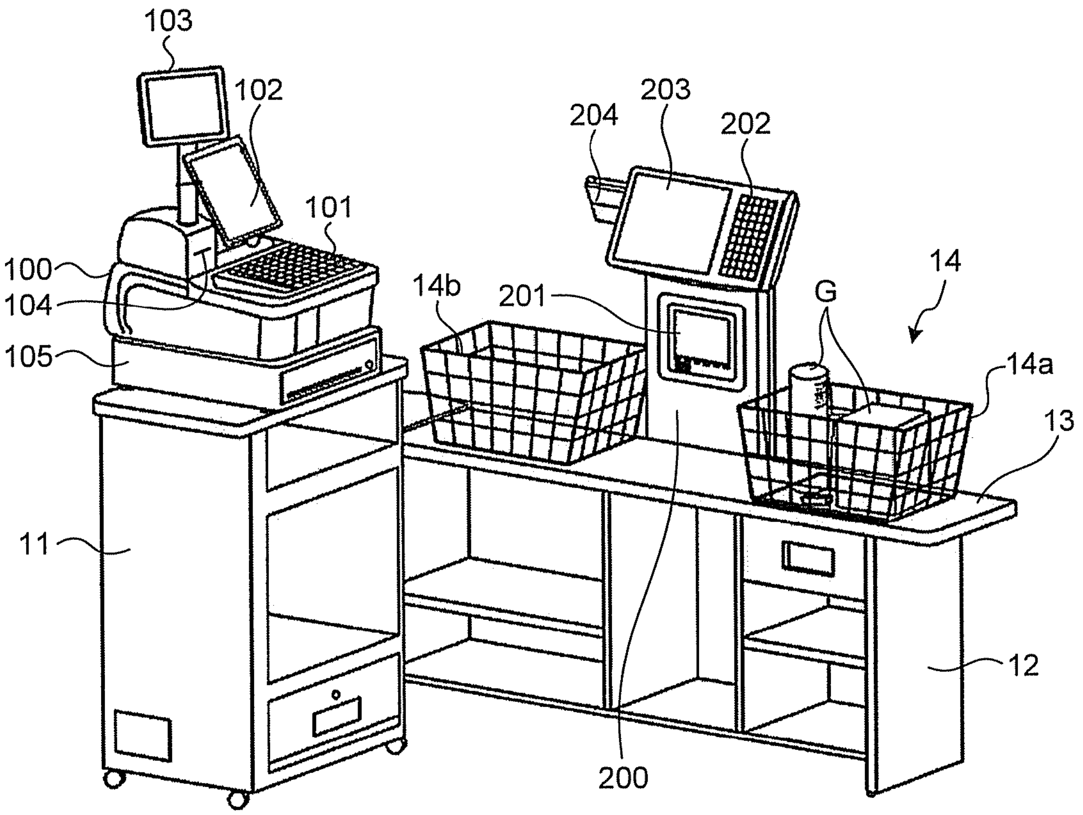
FIG. 1 is a schematic perspective view of the configuration of a checkout system according to an embodiment.

FIG. 1 is a schematic perspective view of the configuration of the checkout system according to this embodiment. As shown in FIG. 1, the checkout system includes a POS terminal 100 and a commodity information reading apparatus 200.

The POS terminal 100 is a commodity information processing apparatus for performing sales registration of commodities to be purchased by a customer and is placed on a checkout table 11. The POS terminal 100 includes a keyboard 101, an operator display 102, a customer display 103, a printer 104, and a drawer 105. The sections included in the POS terminal 100 are explained later.

A counter table 12 having a laterally long table shape is arranged to form an L-shape with the checkout table 11. A loading surface 13 is formed on the upper surface of the counter table 12. The commodity information reading apparatus 200 is placed on the loading surface 13 and is connected to the POS terminal 100 by wire or radio to be capable of communicating with the POS terminal 100.

The commodity information reading apparatus 200 detects a code symbol, which is explained later, affixed to a commodity and outputs various kinds of information (a commodity code, etc.) read from the code symbol to the POS terminal 100. As shown in FIG. 1, the commodity information reading apparatus 200 includes a reading window 201, a keyboard 202, an operator display 203, and a customer display 204. The sections included in the commodity information reading apparatus 200 are explained later.

A shopping basket 14 including commodities G affixed with code labels explained later is placed on the loading surface 13. The shopping basket 14 is classified into a first shopping basket 14*a* carried in by a customer and a second shopping basket 14*b* placed in a position across the commodity information reading apparatus 200 from the first shopping basket 14*a*.

The commodities G purchased in one transaction are stored in the first shopping basket 14*a* carried in by the customer. Barcodes, QR codes, or the like representing commodity codes are affixed to the commodities Gas code symbols. The commodity codes are identification codes allocated to the commodities in order to specify the commodities G. As an example, the commodity codes are JAN (Japan Article Number) codes. On the code symbols of a part or all of the commodities G, benefit labels representing contents of benefits provided by the store for the purchase of the commodities G are affixed (see FIGS. 3A and 3B).

The commodities G in the first shopping basket 14*a* are moved to the second shopping basket 14*b* by an operator who operates the commodity information reading apparatus 200. In this moving process, the code symbols affixed to the commodities G are faced to the reading window 201 of the commodity information reading apparatus 200. When the code symbols are faced to the reading window 201, an image pickup section 215 (see FIG. 2), which is explained later, provided in the reading window 201 picks up images of the code symbols affixed to the commodities G. The commodity information reading apparatus 200 detects the code symbols and the benefit labels included in the picked-up images and performs reading of various kinds of data.

Figure 2:
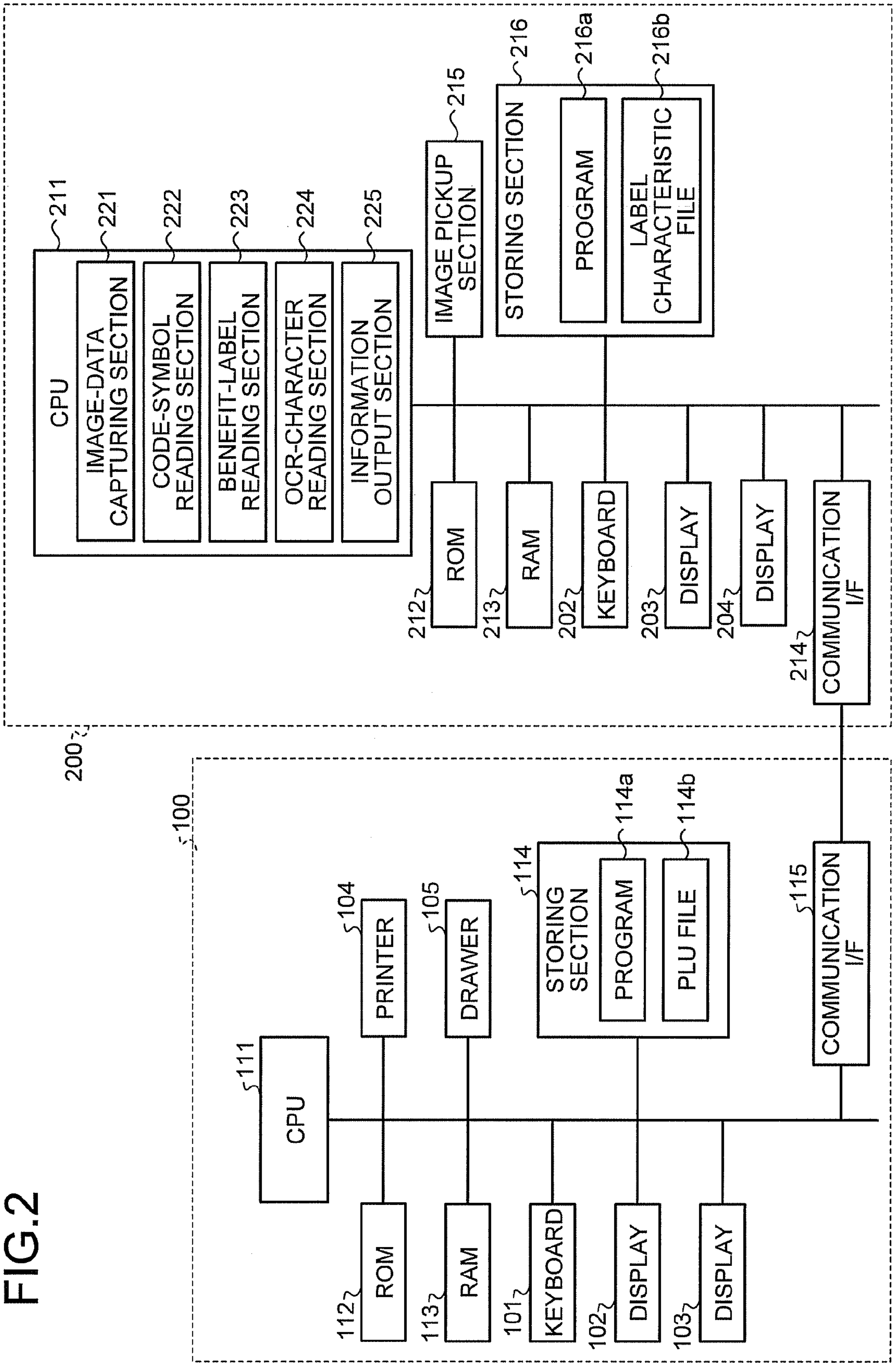
FIG. 2 is a block diagram of the configurations of a POS terminal and a commodity information reading apparatus.

The configuration of the checkout system is explained below. FIG. 2 is a block diagram of the configurations of the POS terminal 100 and the commodity information reading apparatus 200.

First, the configuration of the POS terminal 100 is explained. The POS terminal 100 functions as a microcomputer configured to execute information processing and includes a CPU (Central Processing Unit) 111, a ROM (Read Only Memory) 112, and a RAM (Random Access Memory) 113.

The CPU 111 executes various computer programs stored in the ROM 112 and a storing section 114 explained later to thereby collectively control the POS terminal 100. The ROM 112 has a computer program for performing a basic operation stored therein. The RAM 113 is a main storage of the POS terminal 100 and functions as a work area of the CPU 111.

The keyboard 101, the displays 102 and 103, the printer 104, and the drawer 105 are connected to the CPU 111 via various input and output circuits (not shown).

The keyboard 101 is an input device configured to notify the CPU 111 of information of a key (hereinafter referred to as key information) input from an operator who operates the POS terminal 100. Various operation keys such as a ten key for inputting a number and an operator and a "closing" key necessary for settlement of a commodity price are disposed on the keyboard 101.

The displays 102 and 103 include display devices such as LCDs (Liquid Crystal Displays) and display various kinds of information such as a name and a price of a commodity on the basis of an instruction of the CPU 111. The display 102 is a display for the operator who operates the POS terminal 100. A display surface of the display 102 is arranged to be faced to the operator (see FIG. 1). The display 103 is a display for a customer. A display surface of the display 103 is arranged to be faced to the customer (see FIG. 1). The display 102 may be configured as a touch panel to realize all or a part of the keys of the keyboard 101 on the touch panel.

The printer 104 is a printing apparatus such as a thermal printer. The printer 104 prints a receipt, a journal, or the like according to the control by the CPU 111. The drawer 105 is a cash drawer for storing cash and the like. The drawer 105 opens and closes according to the control by the CPU 111.

The storing section 114 and a communication I/F 115 are connected to the CPU 111 via various input and output circuits (not shown).

The storing section 114 is a storage medium such as a HDD (Hard Disk Drive) or a flash memory. The storing section 114 has a computer program 114*a* executable by the CPU 111 and various files stored therein. An example of the computer program 114*a* stored in the storing section 114 is a computer program for settlement processing. An example of the file stored in the storing section 114 is a PLU file 114*b*. The PLU file 114*b* is a file that stores commodity codes uniquely allocated to commodities and information concerning the commodities such as names, prices, and commodity classifications of the commodities in association with each other.

The communication I/F 115 is an interface for performing data communication with the commodity information reading apparatus 200. The CPU 111 transmits and receives various data to and from the commodity information reading apparatus 200 via the communication I/F 115.

The configuration of the commodity information reading apparatus 200 is explained below. As shown in FIG. 2, the commodity information reading apparatus 200 functions as a microcomputer configured to execute information processing and includes a CPU 211, a ROM 212, and a RAM 213.

The CPU 211 executes various kinds of computer programs stored in the ROM 212 to thereby collectively control the commodity information reading apparatus 200. The ROM 212 has a computer program for performing a basic operation stored therein. The RAM 213 is a main storage of the commodity information reading apparatus 200 and functions as a work area of the CPU 211.

The keyboard 202 and the displays 203 and 204 are connected to the CPU 211 via various input and output circuits (not shown).

The keyboard 202 is an input device configured to notify the CPU 211 of key information input from the operator who operates the commodity information reading apparatus 200. The keyboard 202 is used, for example, in inputting the number of sold items and inputting a commodity code of a commodity, a barcode of which cannot be read.

The displays 203 and 204 include display devices such as LCDs and display various kinds of information such as a name and a price of a commodity on the basis of an instruction of the CPU 211. The display 203 is a display for the operator who operates the commodity information reading apparatus 200. A display surface of the display 203 is arranged to be faced to the operator (see FIG. 1). The display 204 is a display for a customer. A display surface of the display 204 is arranged to be faced to the customer (see FIG. 1). The display 203 may be configured as a touch panel to realize all or a part of the keys of the keyboard 202 on the touch panel.

A communication I/F 214, the image pickup section 215, and a storing section 216 are connected to the CPU 211 via various input and output circuits (not shown).

The communication I/F 214 is an interface for performing data communication with the POS terminal 100. The CPU 211 transmits and receives various data between the commodity information reading apparatus 200 and the POS terminal 100 via the communication I/F 214. The image pickup section 215 is an image sensor such as a CCD (Charge Coupled Device) or a CMOS (Complementary Metal Oxide Semiconductor) and is provided in the reading window 201 shown in FIG. 1. The image pickup section 215 starts and stops image pickup according to the control by the CPU 211.

Figure 3A:
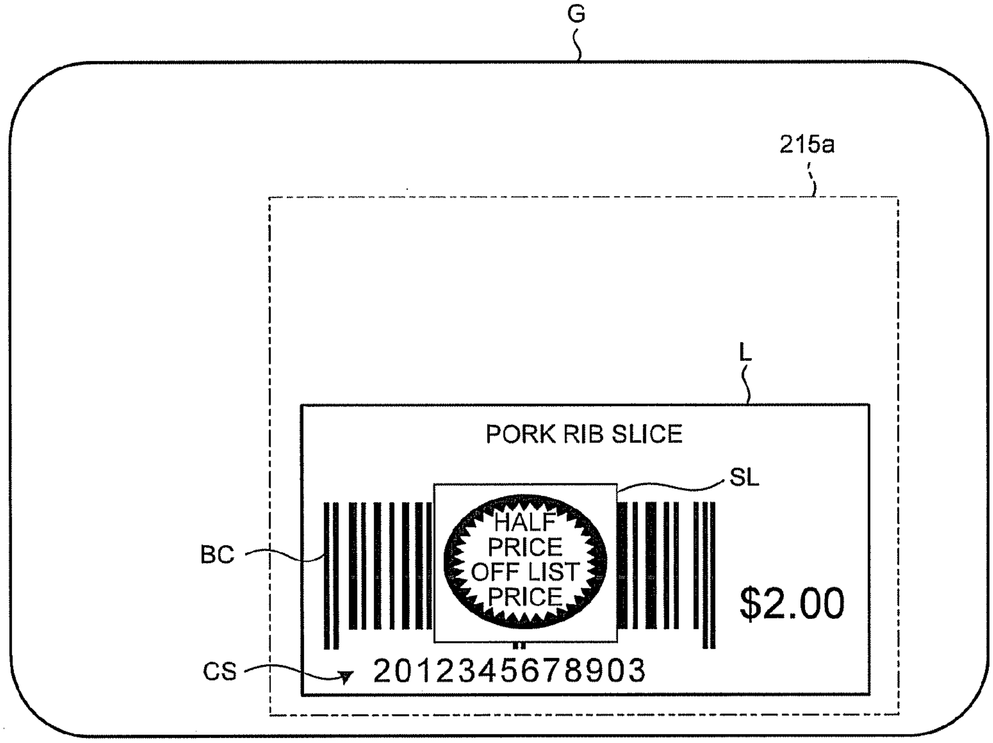
FIGS. 3A and 3B are diagram of examples of a relation between an image pickup area of an image pickup section and a commodity.
Figure 3B:
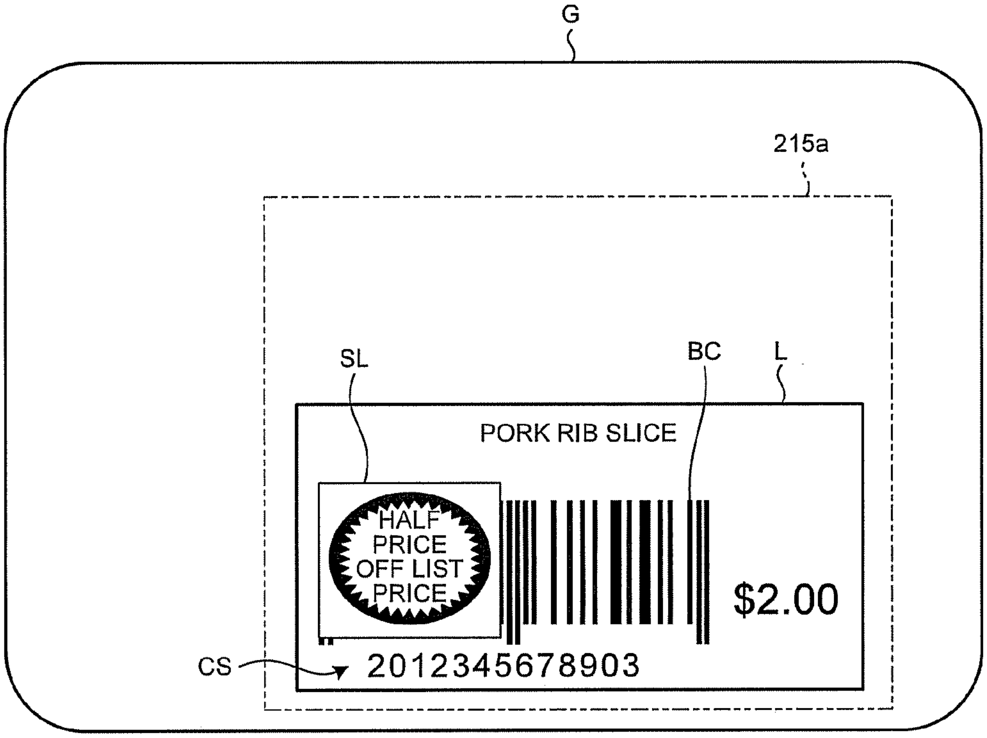

A relation between an image pickup area of the image pickup section 215 and the commodity G is explained with reference to FIGS. 3A and 3B. FIGS. 3A and 3B are diagrams of examples of the relation between the image pickup area of the image pickup section 215 and the commodity G. An area surrounded by a broken line in the figure is an image pickup area 215*a* that is an area where the image pickup section 215 can pick up an image in one frame.

A label L on which a commodity name (pork rib slice) and a price (2 dollars) are shown is affixed to the commodity G. A barcode BC, which is a code symbol, is affixed to the label L. A commodity code of the commodity G is shown in an encoded state. Under the barcode BC, a character string (hereinafter referred to as OCR characters) CS representing a numerical value (2012345678903) of a commodity code incorporated in the barcode BC is shown. On the barcode BC of the commodity G shown in FIGS. 3A and 3B, a benefit label SL representing benefit content related to the commodity G is affixed.

The benefit label SL is affixed on the barcode BC to cover a part or all of bars included in the barcode BC. For example, if the barcode BC is a JAN code, the benefit label SL is affixed in a position where the benefit label SL covers a center bar necessary for recognition as a barcode as shown in FIG. 3A or in a position where the benefit label SL covers a guard bar necessary for recognition as a barcode as shown in FIG. 3B. The affixing of the benefit label SL makes it impossible to read the barcode BC. In this way, in the store that uses the checkout system, if a benefit such as a discount is applied to a specific commodity, a benefit label based on benefit content is affixed on the code symbol to make it impossible to read a code symbol (the barcode BC) of the commodity. The barcode BC is not limited to the JAN code and may be a UPC (Universal Product Code), an EAN (European Article Number) code, or the like.

Referring back to FIG. 2, the storing section 216 is a storage medium such as a HDD or a flash memory. The storing section 216 has a computer program 216*a* executable by the CPU 211 and various files stored therein. Examples of the computer program 216*a* stored in the storing section 216 include a control program for the image pickup section 215, a reading program for a code symbol, a reading program for a benefit label, and a reading program for OCR characters. The storing section 216 has a label characteristic file 216*b* stored therein as a file necessary for the operation of the commodity information reading apparatus 200.

FIG. 4 is a diagram for explaining the label characteristic file 216*b*. As shown in the figure, the label characteristic file 216*b* has label characteristic data indicating a characteristic of an external appearance of a benefit label and benefit information indicating benefit content of the benefit label in association with each other stored therein.

The label characteristic data is information extracted from the benefit label by recognition processing such as pattern recognition or OCR. The benefit information means information obtained by converting information concerning the benefit content represented by the benefit label into an alphanumerical value such that the POS terminal 100 can use the information. For example, in the label characteristic file 216*b* shown in FIG. 4, label characteristic data of No. 1 corresponds to the benefit label SL represented as "half price off list price" as shown in FIG. 3A (or FIG. 3B). Therefore, benefit information "−50%" meaning a discount of 50% is stored in association with this label characteristic data.

A benefit label affixed to a commodity is not limited to the benefit label SL shown in FIGS. 3A and 3B. For example, as indicated by label characteristic data of No. 2 shown in FIG. 4, the benefit label may be a benefit label indicating that a predetermined amount is discounted.

Characteristic functions of the commodity information reading apparatus 200 are explained below. The CPU 211 realizes an image-data capturing section 221, a code-symbol reading section 222, a benefit-label reading section 223, an OCR-character reading section 224, and an information output section 225 as shown in FIG. 2 in cooperation with the computer programs stored in the ROM 212 and the storing section 216.

The image-data capturing section 221 outputs an image pickup ON signal to the image pickup section 215 to thereby cause the image pickup section 215 to start an image pickup operation. The image-data capturing section 221 captures image data in the image pickup area 215*a* picked up by the image pickup section 215 and stores the image data in the RAM 213. If the image-data capturing section 221 receives an instruction of the OCR-character reading section 224, the image-data capturing section 221 captures the image data in the image pickup area 215*a* picked up by the image pickup section 215 and stores the image data in the RAM 213.

The code-symbol reading section 222 executes code symbol reading processing for detecting an image of a code symbol such as a barcode or a QR code from the image data stored in the RAM 213 by the image-data capturing section 221.

Specifically, in the code symbol reading processing, the code-symbol reading section 222 binarizes image data of one frame stored in the RAM 213 and detects whether a data area concerning the code symbol is present in the binarized data.

For example, if the code symbol is a JAN code, the code-symbol reading section 222 detects the JAN code on the basis of a center bar or a guard bar. If the code-symbol reading section 222 detects the data area concerning the code symbol, the code-symbol reading section 222 decodes the code symbol to read a commodity code represented by the code symbol. The code-symbol reading section 222 stores the read commodity code in the RAM 213.

If the reading of the code symbol by the code-symbol reading section 222 is not realized, the benefit-label reading section 223 executes benefit label reading processing for detecting an image of a benefit label from the image data stored in the RAM 213 by the image-data capturing section 221.

Specifically, in the benefit label reading processing, the benefit-label reading section 223 collates a characteristic of a character string or a mark such as a picture or a symbol detected from a predetermined area in the image data by pattern recognition or OCR character recognition and the label characteristic data (see FIG. 4) of the label characteristic file 216*b*. If a degree of coincidence is equal to or larger than a predetermined value, the benefit-label reading section 223 determines that a benefit label is detected in the area. If the benefit-label reading section 223 detects the benefit label, the benefit-label reading section 223 reads benefit information associated with label characteristic data of the benefit label from the label characteristic file 216*b* and stores the benefit information in the RAM 213. As a threshold in the determination of a degree of coincidence, an arbitrary value such as 90% can be set.

If the reading of the benefit label by the benefit-label reading section 223 is realized, the OCR-character reading section 224 executes OCR character reading processing for detecting OCR characters from the image data stored in the RAM 213 by the image-data capturing section 221.

Specifically, in the OCR character reading processing, the OCR-character reading section 224 collates the image data of one frame stored in the RAM 213 and registered character data stored in the storing section 216 in advance for identification of a commodity code. If a character string having a high degree of coincidence is detected, the OCR-character reading section 224 determines that an OCR character string is detected. If the OCR character string is detected, the OCR-character reading section 224 reads a numerical value represented by the OCR character string as a commodity code and stores the commodity code in the RAM 213.

The information output section 225 transmits (outputs) the commodity code stored in the RAM 213 to the POS terminal 100 via the communication I/F 214. If benefit information is stored in the RAM 213, the information output section 225 transmits the benefit information to the POS terminal 100 via the communication I/F 214 together with the commodity code.

On the other hand, if the CPU 111 of the POS terminal 100 receives the commodity code from the commodity information reading apparatus 200, the CPU 111 reads, referring to the PLU file 114*b*, a price and the like of a commodity corresponding to the commodity code and performs sales registration of the commodity. If the CPU 111 of the POS terminal 100 receives the benefit information together with the commodity code, the CPU 111 executes processing corresponding to content of the benefit information. For example, if the benefit information is "−50%", the CPU 111 performs the sales registration after discounting the price of the commodity read from the PLU file 114*b* by 50%.

Figure 5:
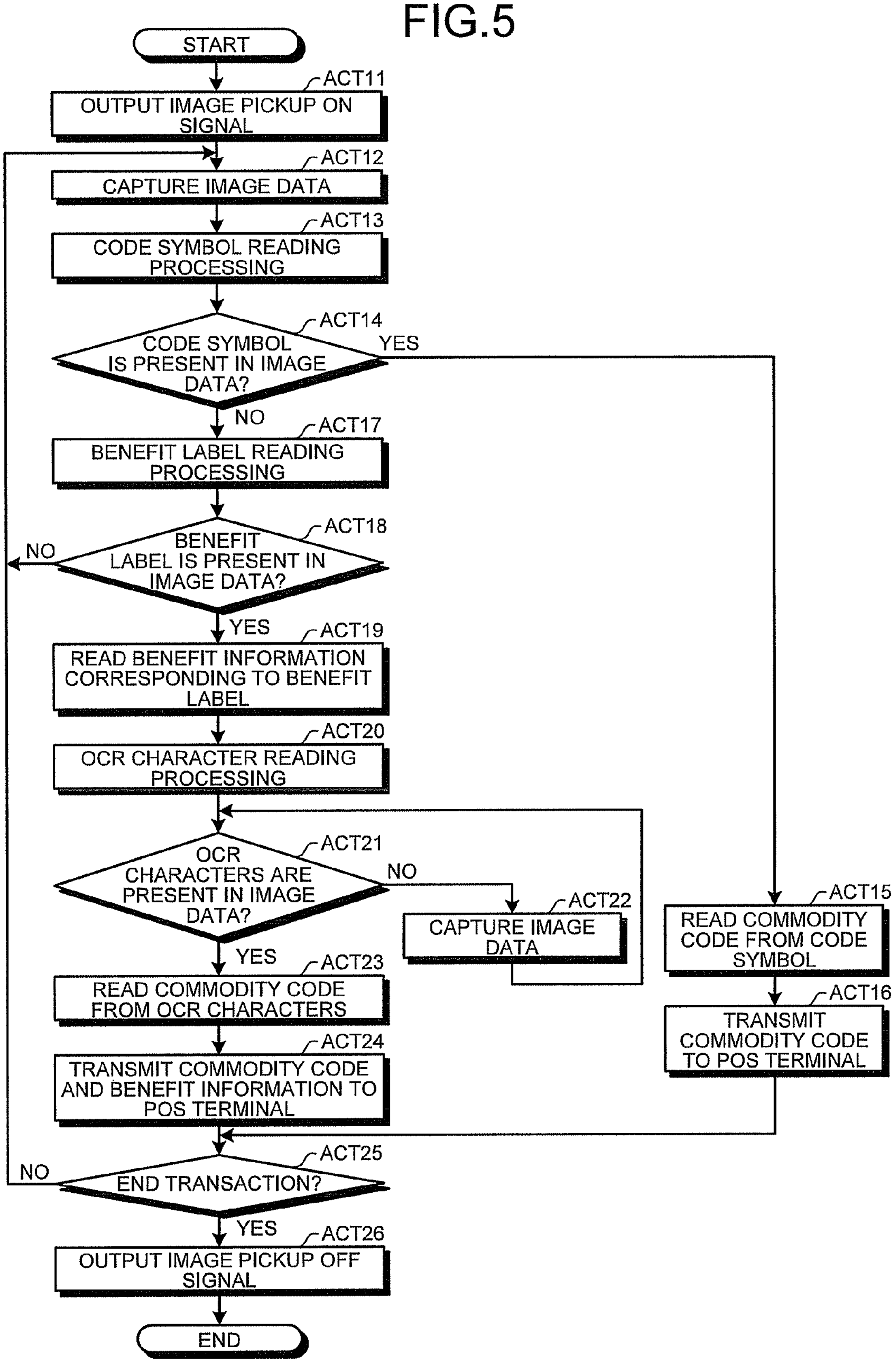
FIG. 5 is a flowchart for explaining a procedure of information output processing performed by the commodity information reading apparatus.

The operation of the checkout system according to this embodiment is explained with reference to FIG. 5. FIG. 5 is a flowchart for explaining a procedure of information output processing performed by the commodity information reading apparatus 200. The information output processing is started according to a predetermined signal for instructing the start of a transaction transmitted from the POS terminal 100.

First, the image-data capturing section 221 outputs an image pickup ON signal to the image pickup section 215 and starts an image pickup operation by the image pickup section 215 (ACT 11). Subsequently, the image-data capturing section 221 captures image data picked up by the image pickup section 215 and stores the image data in the RAM 213 (ACT 12).

If the image data is stored in the RAM 213, the code-symbol reading section 222 starts the code symbol reading processing (ACT 13) and determines whether an image of a code symbol is present in the image data stored in the RAM 213 (ACT 14). If the code-symbol reading section 222 determines that an image of a code symbol is present (Yes in ACT 14), the code-symbol reading section 222 reads a commodity code from the code symbol and stores the commodity code in the RAM 213 (ACT 15). The information output section 225 transmits the commodity code stored in the RAM 213 to the POS terminal 100 (ACT 16) and shifts to ACT 25.

On the other hand, if the code-symbol reading section 222 determines that an image of a code symbol is absent (No in ACT 14), the benefit-label reading section 223 starts the benefit label reading processing for the image data stored in the RAM 213 (ACT 17). The benefit-label reading section 223 determines whether an image of a benefit label is present in the image data stored in the RAM 213 (ACT 18). If the benefit-label reading section 223 determines that an image of a benefit label is absent (No in ACT 18), the benefit-label reading section 223 returns the processing to Act 12 to cause the image-data capturing section 221 to perform capturing of new image data.

If the benefit-label reading section 223 determines in ACT 18 that an image of a benefit label is present in the image data (Yes in ACT 18), the benefit-label reading section 223 reads benefit information corresponding to the benefit label from the label characteristic file 216*b* and stores the benefit information in the RAM 213 (ACT 19).

Subsequently, the OCR-character reading section 224 starts the OCR character reading processing for the image data stored in the RAM 213 (ACT 20). The OCR-character reading section 224 determines whether OCR characters are present in the image data stored in the RAM 213. If the OCR-character reading section 224 determines that OCR characters are absent (No in ACT 21), the OCR-character reading section 224 instructs the image-data capturing section 221 to capture image data, causes the image-data capturing section 221 to perform capturing of new image data (ACT 22), and returns to ACT 21. The OCR-character reading section 224 repeatedly executes the processing from No in ACT 21 to ACT 22 until OCR characters are detected from image data.

If the OCR-character reading section 224 determines in ACT 21 that OCR characters are present in the image data (Yes in ACT 21), the OCR-character reading section 224 reads a numerical value represented by the OCR characters as a commodity code and stores the commodity code in the RAM 213 (ACT 23). Subsequently, the information output section 225 transmits the commodity code and the benefit information stored in the RAM 213 to the POS terminal 100 (Act 24) and shifts to ACT 25.

In ACT 25, the CPU 211 determines whether the end of a transaction is instructed by a predetermined signal from the POS terminal 100 (ACT 25). If the end of a transaction is not instructed (No in ACT 25), the CPU 211 returns to ACT 12 and repeatedly executes the processing in ACTS 12 to 24 until sales registration of all commodities is completed. Every time sales registration of a commodity is performed, i.e., every time a commodity code of one commodity is transmitted to the POS terminal 100, the commodity code (and the benefit information) stored in the RAM 213 is cleared.

If the CPU 211 receives an instruction for the end of a transaction in ACT 25 (Yes in ACT 25), the image-data capturing section 221 outputs an image pickup OFF signal to the image pickup section 215 to stop the image pickup operation by the image pickup section 215 (ACT 26) and ends the processing.

As explained above, according to this embodiment, if reading of a code symbol is realized, i.e., if a benefit label is not affixed, a commodity code read from the code symbol is transmitted to the POS terminal 100. If reading of a code symbol is not realized because a benefit label is affixed, benefit information corresponding to the benefit label is transmitted to the POS terminal 100 together with a commodity code read from OCR characters. Consequently, since it is possible to more surely read a benefit label affixed to a commodity, it is possible to prevent the store clerk from overlooking the benefit label. Since the benefit label is affixed on the code symbol, it is possible to omit time and labor for specially adjusting a reading position of the benefit label according to the image pickup area 215*a*. Therefore, it is possible to efficiently perform reading of the benefit label.

The embodiment of the present invention is explained above. However, the present invention is not limited to the embodiment. Various changes, replacements, additions, and the like are possible without departing from the spirit of the present invention. Those skilled in the art can easily derive further effects and modifications. Therefore, a wider form of the present invention is not limited to the specific details and the representative embodiment represented and described above. Therefore, various changes are possible without departing from the spirit or the scope of the general concept of the invention defined by the appended claims and equivalents of the claims.

For example, in the embodiment, a commodity code is represented by a code symbol and OCR characters as commodity information concerning a commodity. However, the present invention is not limited to this. Other information concerning the commodity may be represented by the code symbol and the OCR characters.

The computer programs executed in the POS terminal 100 and the commodity information reading apparatus 200 according to the embodiment may be provided while being recorded in a computer-readable recording medium such as a CD-ROM, a flexible disk (FD), a CD-R, or a DVD (Digital Versatile Disk) as a file of an installable format or an executable format.

The computer programs executed in the POS terminal 100 and the commodity information reading apparatus 200 according to the embodiment may be provided while being stored on a computer connected to a network such as the Internet and downloaded through the network. The computer programs executed in the POS terminal 100 and the commodity information reading apparatus 200 according to the embodiment may be provided or distributed through the network such as the Internet.

In the embodiment, the label characteristic file 216*b* is stored in the commodity information reading apparatus 200. However, the label characteristic file 216*b* may be stored in an external storage (e.g., a server apparatus) accessible by the commodity information reading apparatus 200.

What is claimed is:

1. A commodity information reading apparatus that performs reading of commodity information from a commodity affixed with a code symbol and a character string representing the commodity information, the apparatus comprising:

an image capturing section configured to capture an image picked up by an image pickup section;

a first reading section configured to detect the code symbol from the image of the commodity captured by the image capturing section and read the commodity information represented by the code symbol;

a second reading section configured to detect, if the reading by the first reading section is not realized because a benefit label which is affixed to a position on the code symbol where reading of the code symbol is impossible and which represents content of a benefit applied to the commodity, the benefit label from the image captured by the image capturing section and read benefit information corresponding to the benefit label; and a third reading section configured to detect, if the reading by the second reading section is realized, the character string from the image captured by the image capturing section and read the commodity information represented by the character string.

2. The apparatus according to claim 1, wherein the second reading section detects, on the basis of a characteristic file for managing label characteristic data that defines characteristics of benefit labels, as the benefit label, an area in the image where a degree of coincidence with the label characteristic data is equal to or larger than a predetermined value.

3. The apparatus according to claim 2, wherein in the characteristic file, benefit information is managed in association with the label characteristic data, and the second reading section reads, from the characteristic file, benefit information corresponding to the benefit label detected from the image captured by the image capturing section.

4. The apparatus according to claim 1, wherein the third reading section causes the image capturing section to perform the capturing of the image until the character string is detected.

5. The apparatus according to claim 1, wherein, in the benefit information, information concerning a discount of a price of the commodity specified by the commodity information is defined.

6. The apparatus according to claim 1, further comprising a transmitting section configured to transmit, if the first reading section reads the commodity information, the commodity information to an external apparatus and transmit, if the third reading section reads the commodity information, the commodity information to the external apparatus together with the benefit information read by the second reading section.

7. The apparatus according to claim 1, wherein the code symbol is anyone of a JAN code, a UPC code, and an EAN code.

8. The apparatus according to claim 7, wherein the benefit label is affixed to a position where the benefit label covers a center bar of the code symbol.

9. The apparatus according to claim 7, wherein the benefit label is affixed to a position where the benefit label covers a guard bar of the code symbol.

10. A commodity information reading method for performing reading of commodity information from a commodity affixed with a code symbol and a character string representing the commodity information, the method comprising:

capturing an image picked up by an image pickup section;

detecting the code symbol from the captured image of the commodity and reading the commodity information represented by the code symbol;

detecting, if the reading of the commodity information represented by the code symbol is not realized, a benefit label representing content of a benefit applied to the commodity from the captured image and reading benefit information corresponding to the benefit label; and detecting, if the reading of the benefit information corresponding to the benefit label is realized, the character string from the captured image and reading the commodity information represented by the character string, wherein a benefit label is affixed to a position on the code symbol where reading of the code symbol is impossible.

* * * * *